United States Patent
Kamigashima et al.

(10) Patent No.: US 8,425,285 B2
(45) Date of Patent: Apr. 23, 2013

(54) DUCT INSTALLATION STRUCTURE

(75) Inventors: Hayato Kamigashima, Kariya (JP); Takahiro Mizuno, Kariya (JP); Nobuhiro Ichimura, Kariya (JP); Hidetoshi Matsumoto, Anjo (JP)

(73) Assignees: Toyota Shatai Kabushiki Kaisha, Kariya-shi (JP); Inoac Corporation, Nagoya-shi (JP)

( * ) Notice: Subject to any disclaimer, the term of this patent is extended or adjusted under 35 U.S.C. 154(b) by 982 days.

(21) Appl. No.: 12/519,237

(22) PCT Filed: Jan. 24, 2008

(86) PCT No.: PCT/JP2008/050998
§ 371 (c)(1),
(2), (4) Date: Jun. 15, 2009

(87) PCT Pub. No.: WO2009/001570
PCT Pub. Date: Dec. 31, 2008

(65) Prior Publication Data
US 2010/0062703 A1    Mar. 11, 2010

(30) Foreign Application Priority Data
Jun. 26, 2007    (JP) ................... 2007-167732

(51) Int. Cl.
*B60H 1/34*    (2006.01)
(52) U.S. Cl.
USPC ................. 454/152; 454/331; 454/69
(58) Field of Classification Search .......... 454/152, 454/330, 331, 289
See application file for complete search history.

(56) References Cited

U.S. PATENT DOCUMENTS

| 1,599,255 | A | * | 9/1926 | Sparrow | 411/123 |
| 1,908,067 | A | * | 5/1933 | Sharp et al. | 248/49 |
| 1,956,879 | A | * | 5/1934 | Sharp | 52/741.1 |

(Continued)

FOREIGN PATENT DOCUMENTS

| DE | 19540020 A1 | * | 4/1997 |
| JP | 11 254949 | | 9/1999 |
| JP | 2000 355211 | | 12/2000 |

(Continued)

OTHER PUBLICATIONS

Japanese Office Action issued Jan. 31, 2012, in Patent Application No. 2007-167732 (with English-language translation).

*Primary Examiner* — Steven B McAllister
*Assistant Examiner* — Phillip E Decker
(74) *Attorney, Agent, or Firm* — Oblon, Spivak, McClelland, Maier & Neustadt, L.L.P.

(57) ABSTRACT

A duct installation structure in which an air conditioning duct for sending warm air or cold air into a vehicle interior of an automobile is attached to a vehicle interior structure member and an outlet grill is attached to an outlet opening end portion of the air conditioning duct. A grill fixing portion to which the outlet grill is to be fixed is integrally molded with a duct main body portion at the outlet opening end portion of the air conditioning duct. The outlet grill is directly fixed to the grill fixing portion. The outlet opening end portion of the air conditioning duct including, at one point near its center in a width direction, a fastening fixing portion that is fastened and fixed to the vehicle interior structure member and including, at its opposite ends in the width direction, a pair of contact portions for coming in contact with the vehicle interior structure member.

4 Claims, 10 Drawing Sheets

U.S. PATENT DOCUMENTS

| | | | | |
|---|---|---|---|---|
| 1,979,543 | A * | 11/1934 | Heasley | 454/331 |
| 2,205,640 | A * | 6/1940 | Wendt | 296/210 |
| 2,505,214 | A * | 4/1950 | Schrum | 454/158 |
| 3,166,633 | A * | 1/1965 | Guzan, Jr. et al. | 52/220.5 |
| 3,308,738 | A * | 3/1967 | Heimann | 454/90 |
| 3,494,657 | A * | 2/1970 | Harper et al. | 296/208 |
| 4,091,743 | A * | 5/1978 | Lemon | 105/375 |
| 4,136,606 | A * | 1/1979 | Wolbrink | 454/231 |
| 4,850,162 | A * | 7/1989 | Albrecht | 52/126.6 |
| 5,338,255 | A * | 8/1994 | Akehurst | 454/292 |
| 6,547,301 | B1 * | 4/2003 | Keller | 296/39.3 |
| 6,652,375 | B2 * | 11/2003 | Donnelly | 454/330 |
| 2005/0087167 | A1 * | 4/2005 | Kim | 123/198 E |
| 2006/0137644 | A1 * | 6/2006 | Kino et al. | 123/184.21 |
| 2006/0240760 | A1 * | 10/2006 | Bubenhofer et al. | 454/69 |
| 2007/0184773 | A1 * | 8/2007 | Babian | 454/143 |
| 2007/0186904 | A1 * | 8/2007 | Braithwaite et al. | 123/434 |

FOREIGN PATENT DOCUMENTS

| | | |
|---|---|---|
| JP | 2001 88543 | 4/2001 |
| JP | 2001 347823 | 12/2001 |

* cited by examiner

DUCT INSTALLATION STRUCTURE

TECHNICAL FIELD

The present invention relates to a duct installation structure in which an air conditioning duct for sending warm air or cold air into a vehicle interior of an automobile is attached to a vehicle interior structure member and an outlet grill is attached to an outlet opening end portion of the air conditioning duct.

BACKGROUND ART

There is a duct installation structure in which a heater duct for sending warm air into a vehicle interior of an automobile is installed (Patent Document 1).

As shown in FIG. 10, the prior-art duct installation structure is formed by attaching the heater duct 91 to a floor of the vehicle interior and attaching an outlet grill 92 to an outlet opening end portion 911 of the heater duct 91.

The heater duct 91 is a resin molded article obtained by blow molding.

The heater duct 91 is fixed to the floor by a bolt 941 at an iron plate bracket 93 attached to the outlet opening end portion 911 by rivets 931. After the heater duct 91 is attached onto the floor, a floor carpet is laid over the heater duct 91 and then the outlet grill 92 is fixed to the iron plate bracket 93 by bolts 942.

In this way, it is possible to obtain the duct installation structure in which the heater duct 91 is fixed to the floor and the outlet grill 92 is disposed at the outlet opening end portion 911.

In the prior-art duct installation structure, however, the iron plate bracket 93 is attached to the opening end portion 911 of the heater duct 91, which increases the number of parts. As a result, the duct installation structure increases in weight and the cost increases as well. Because the number of parts increases, dimensions of the parts are likely to vary. In other words, dimensional accuracy is required between the heater duct 91 and the iron plate bracket 93 and also between the iron plate bracket 93 and the outlet grill 92, for example, and therefore it is necessary to further reduce dimensional variations of respective component parts.

Patent Document 1: JP 2001-88543 Unexamined Patent Publication (Kokai)

DISCLOSURE OF THE INVENTION

Problems to be Solved by the Invention

The present invention has been made in view of the above conventional problems and an object of the present invention is to provide a duct installation structure with fewer component parts that can achieve reduction in weight and cost.

Means for Solving the Problems

The present invention provide a duct structure, comprising:
an air conditioning duct for sending warm air or cold air into a vehicle interior of an automobile attached to a vehicle interior structure member, and
an outlet grill attached to an outlet opening end portion of the air conditioning duct,
wherein a grill fixing portion to which the outlet grill is to be fixed is integrally molded with a duct main body portion at the outlet opening end portion of the air conditioning duct, and
the outlet grill is directly fixed to the grill fixing portion.

Next, operation and effects of the present invention will be described.

In the duct installation structure, the grill fixing portions are integrally molded with the duct main body portion. The outlet grill is directly fixed to the grill fixing portions. This enables the outlet grill and the duct main body portion to be directly fixed to each other without interposing a bracket therebetween. Therefore, the number of component parts of the duct installation structure can be reduced.

As a result, it is possible to achieve reduction in weight and cost of the duct installation structure.

As described above, according to the present invention, it is possible to provide a duct installation structure with fewer component parts that can achieve reduction in weight and cost.

BEST MODE FOR CARRYING OUT THE INVENTION

Figure 1:
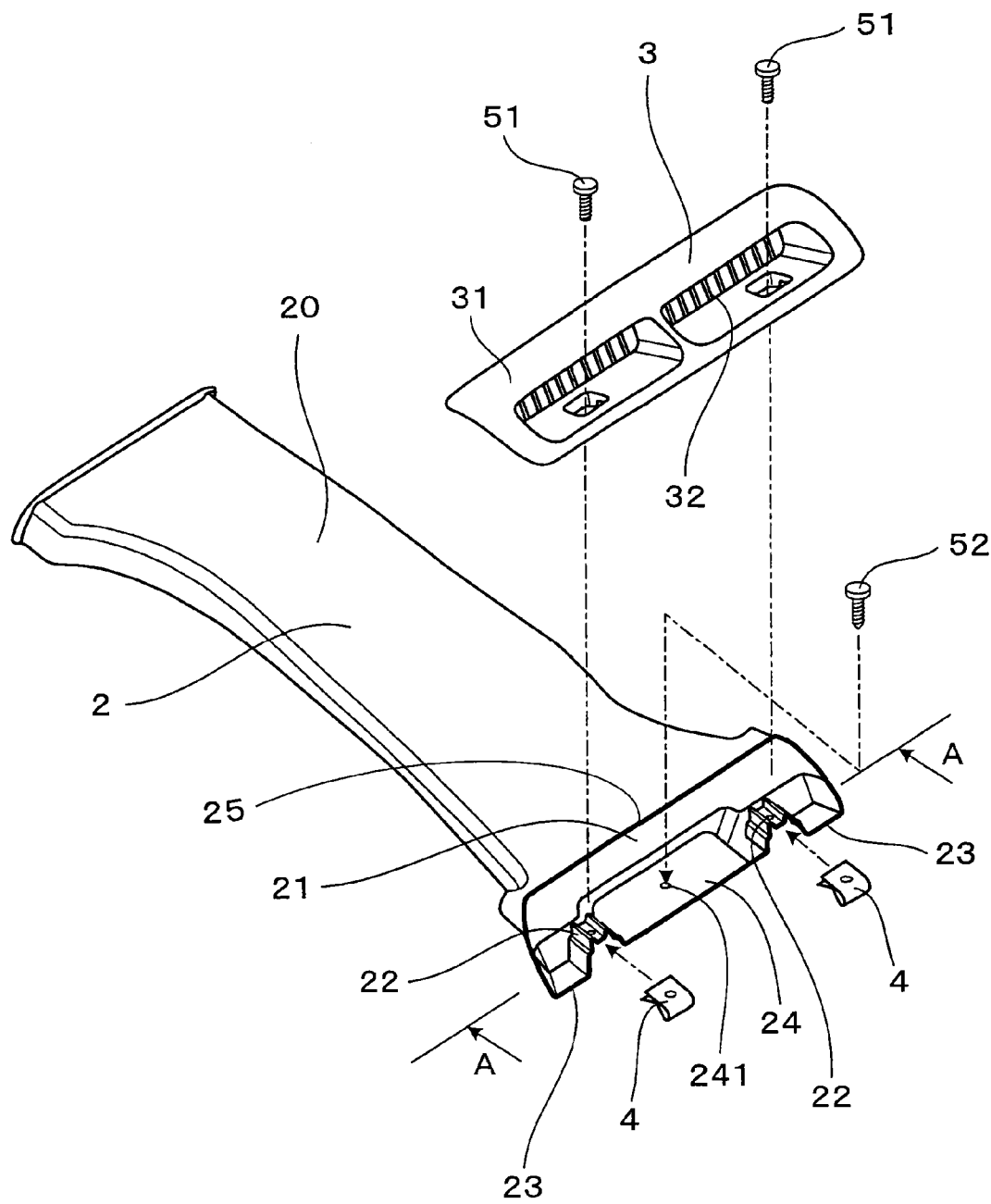
FIG. 1 is an exploded perspective explanatory view of component parts of a grill installation structure in an embodiment.

In the present invention, the air conditioning duct may be made of a resin molded article formed by blow molding, for example.

Examples of the air conditioning duct include a heater duct for sending warm air, and a cooler duct for sending cold air.

Examples of the vehicle interior structure member include a floor and a ceiling panel of the vehicle interior.

It is preferable that the outlet opening end portion of the air conditioning duct has, at one point near its center in a width direction, a fastening fixing portion that is fastened and fixed to the vehicle interior structure member and is provided, at its opposite ends in the width direction, with a pair of contact portions for coming in contact with the vehicle interior structure member.

In this case, it is possible to stably fix the outlet opening end portion of the air conditioning duct to the floor and it is also possible to secure the rigidity of the outlet opening end portion.

It is preferable that the grill fixing portion is formed between the fastening fixing portion and the contact portion of the outlet opening end portion and is provided with a through hole, the outlet grill is fixed to the grill fixing portion by a spring nut that is disposed and fitted to pinch the grill fixing portion from upper and lower sides and a bolt screwed into the spring nut, the grill fixing portion is provided with a rib protruding in a thickness direction of the grill fixing portion, and an inner face of the spring nut is in contact with the rib.

In this case, it is possible to easily and reliably fix the outlet grill to the grill fixing portions. Because the rib is formed at the grill fixing portion, the spring nut can reliably pinch the grill fixing portion. If the rib is not provided and thicknesses of the grill fixing portion vary, a force of the spring nut for pinching the grill fixing portion may become insufficient or it may become difficult to fit the spring nut over the grill fixing portion.

In other words, if the thickness of the grill fixing portion is excessively small, the force of the spring nut for pinching the grill fixing portion may become insufficient. As a result, the spring nut may come off or be displaced before fixing the outlet grill with the bolt after disposing the spring nut at the grill fixing portion.

If the thickness of the grill fixing portion is excessively large, on the other hand, an insertion load at the time of attaching the spring nut to the grill fixing portion may become so large that attachment work of the spring nut may become difficult.

Especially when the duct main body portion is molded by blow molding, it is difficult to control the thickness of the grill fixing portion and the above problems are likely to occur.

Therefore, in the present invention, by providing the rib to the grill fixing portion, height of the rib provides a fitting thickness required to be fitted in the spring nut irrespective of the thickness of the grill fixing portion, which can suppress variations in the fitting thickness. As a result, it is possible to prevent coming off and displacement of the spring nut to thereby improve workability in attaching the spring nut to the grill fixing portion. Moreover, providing the rib reduces a contact area between the spring nut and the grill fixing portion to thereby reduce the insertion load. As a result, the spring nut can be smoothly attached to the grill fixing portion.

It is preferable that the grill fixing portion is formed at a plurality of positions in the outlet opening end portion.

In this case, it is possible to stably fix the outlet grill to the outlet opening end portion.

Embodiment

A duct installation structure according to an embodiment of the present invention will be described by using FIGS. 1 to 8.

Figure 2:
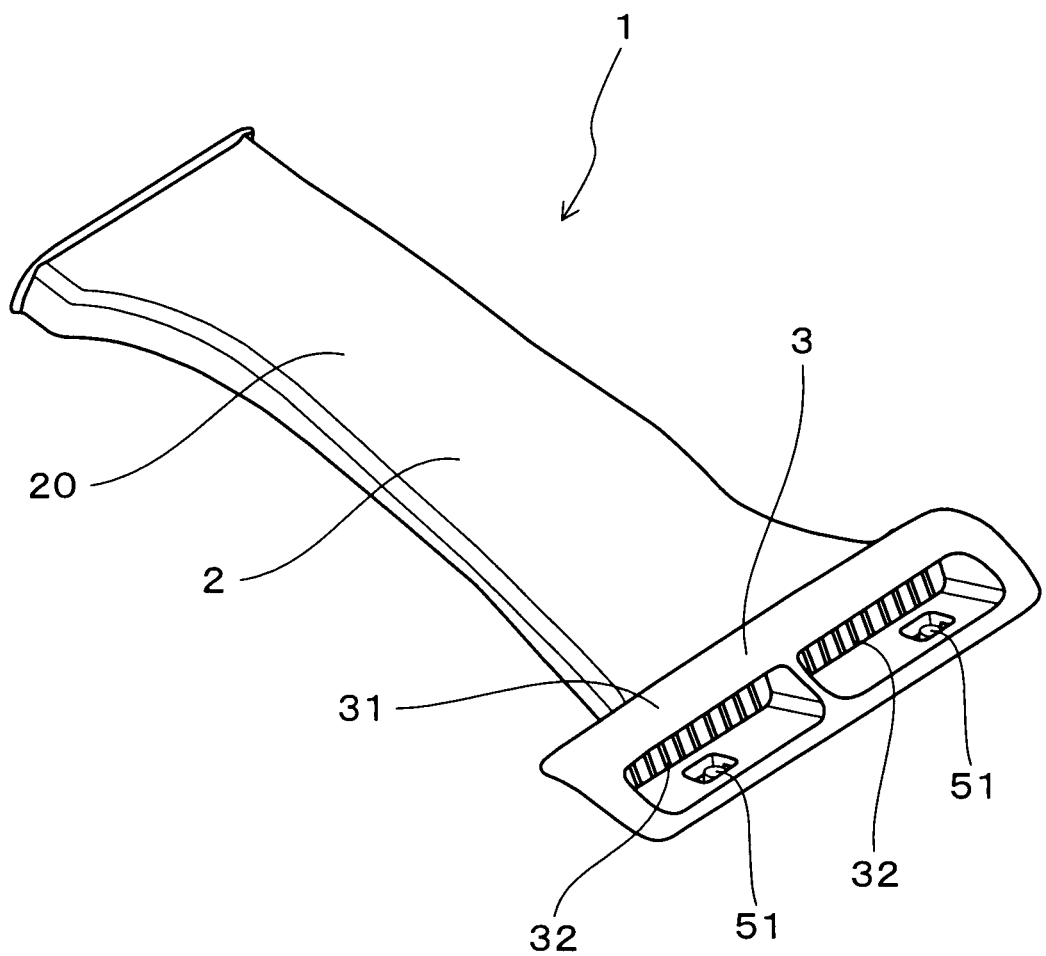
FIG. 2 is a perspective explanatory view of the grill installation structure in the embodiment.

In the duct installation structure 1 in the present embodiment, as shown in FIGS. 1 and 2, a heater duct 2 for sending warm air into a vehicle interior of an automobile is attached to a floor 6 (floor panel 61) that is a vehicle interior structure member and an outlet grill 3 is attached to an outlet opening end portion 21 of the heater duct 2.

Figure 3:
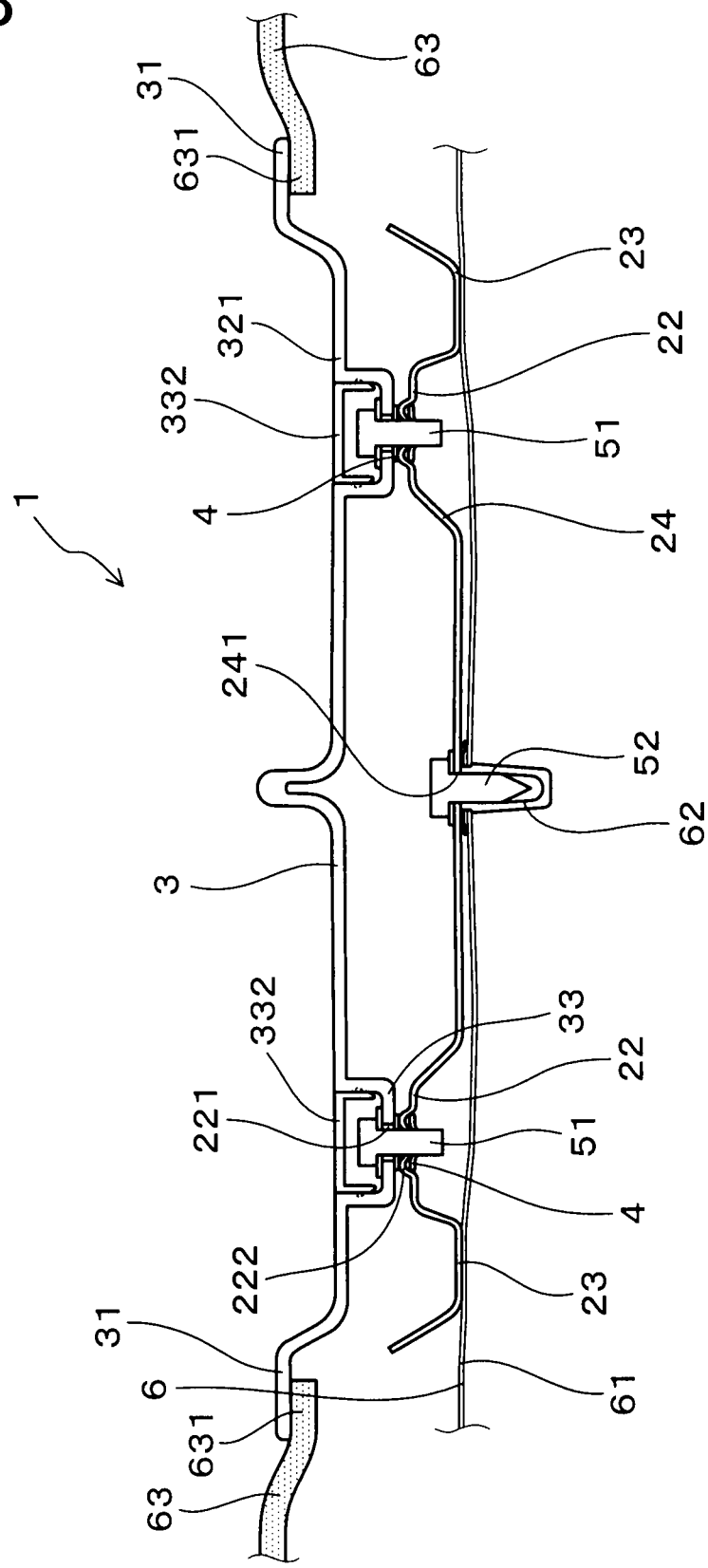
FIG. 3 is a sectional explanatory view of the grill installation structure in the embodiment taken along a line A-A and as viewed from a direction of arrows in FIG. 1.
Figure 4:
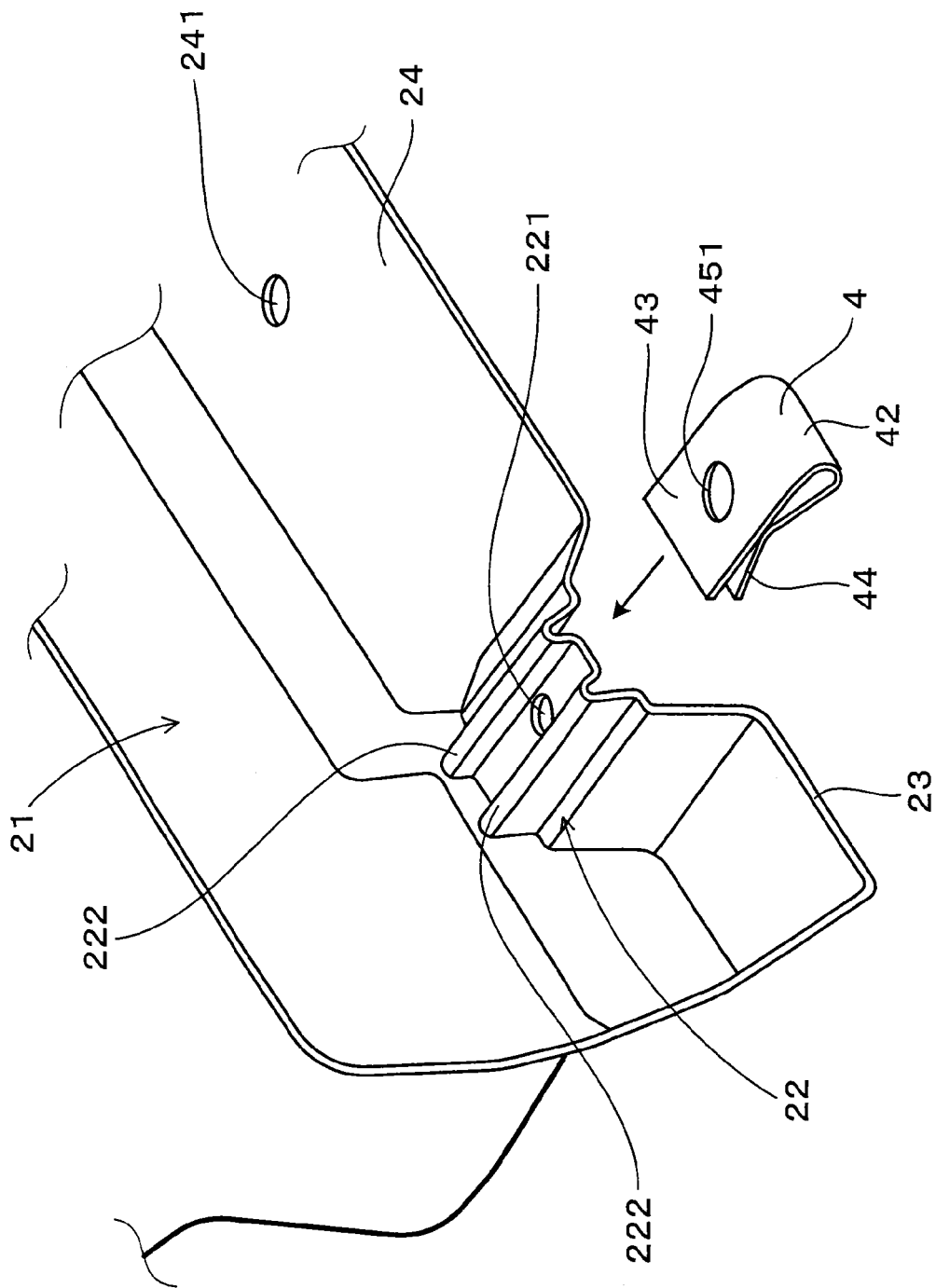
FIG. 4 is a perspective explanatory view of a grill fixing portion in the embodiment.

As shown in FIGS. 3 and 4, at the outlet opening end portion 21 of the heater duct 2, grill fixing portions 22 for fixing the outlet grill 3 are integrally molded with a duct main body portion 20.

The outlet grill 3 is directly fixed to the grill fixing portions 22.

The heater duct 2 is formed of a resin molded article formed by blow molding. The heater duct 2 is in a cylindrical shape having, inside itself, a warm air flow path in which warm air flows. The outlet opening end portion 21 is formed at one end of the warm air flow path. The heater duct 2 has a flat shape having substantially flat upper and lower faces.

The heater duct 2 is fixed to the floor 6 of the vehicle interior and then the upper face of the heater duct 2 excluding the outlet opening end portion 21 is covered with a floor carpet 63. Then, the outlet grill 3 is attached to the outlet opening end portion 21.

Figure 5:
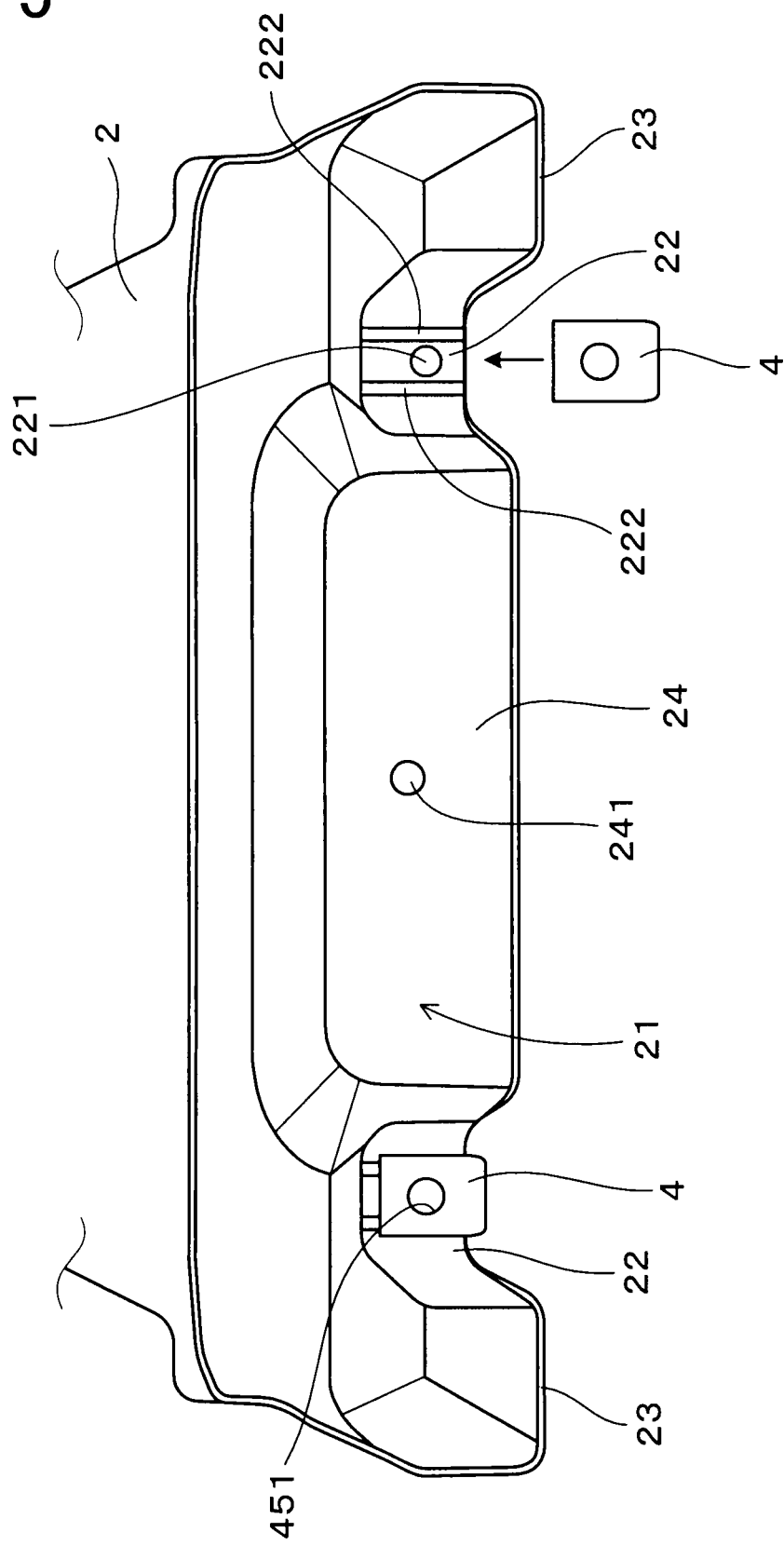
FIG. 5 is a top view of an outlet opening end portion of a heater duct in the embodiment.
Figure 7:
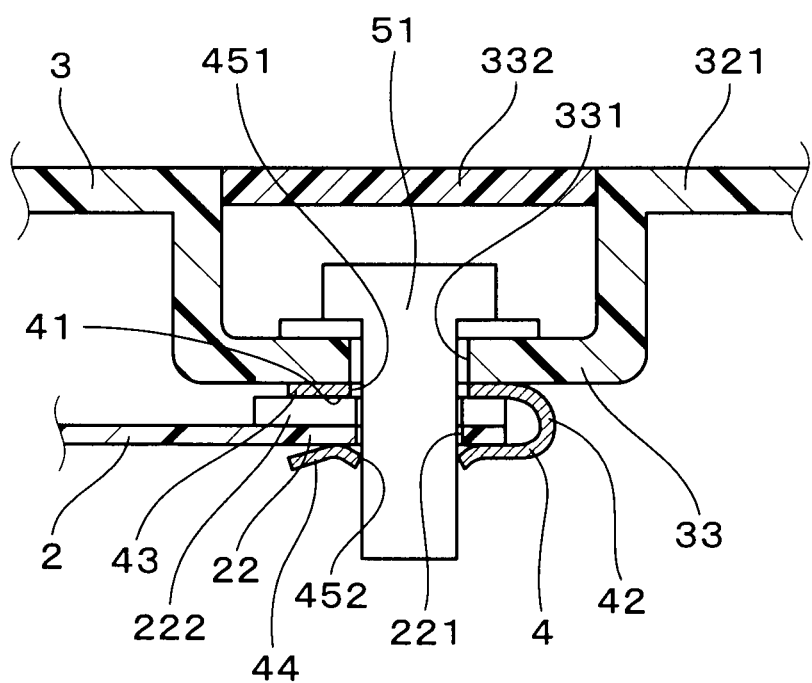
FIG. 7 is a cross-sectional view of a fastening structure of the outlet grill to the grill fixing portion along a section parallel to a sending direction.
Figure 8:
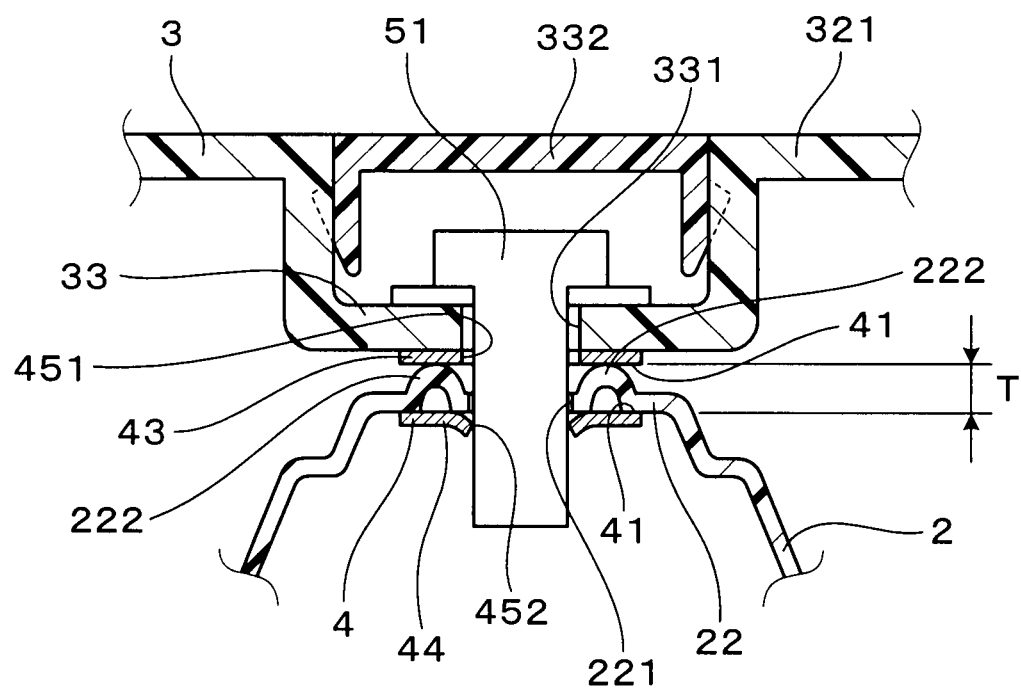
FIG. 8 is a cross-sectional view of the fastening structure of the outlet grill to the grill fixing portion along a section orthogonal to the sending direction.

As shown in FIGS. 4 and 5, the grill fixing portions 22 are formed on a lower plate portion 24 constituting a lower face of the outlet opening end portion 21 and provided with through holes 221. The outlet grill 3 is fixed to the grill fixing portions 22 by spring nuts 4 that are disposed and fitted to pinch the grill fixing portions 22 from upper and lower sides and bolts 51 screwed into the spring nuts 4. As shown in FIGS. 7 and 8, at each of the grill fixing portions 22, ribs 222 protruding in a direction of a thickness of the grill fixing portion 22 are formed. An inner face 41 of the spring nut 4 is in contact with the ribs 222.

As shown in FIG. 7, each of the spring nuts 4 has an upper chip 43 and a lower chip 44 facing each other and formed successively with a folded portion 42 interposed therebetween. The spring nut 4 is fitted over the grill fixing portion 22 while the upper chip 43 and the lower chip 44 are biased in such directions as to approach each other. A through hole 451 through which the bolt 51 is inserted is formed in the upper chip 43 and a pawl 452 to be screwed engagement with the bolt 51 is provided to the lower chip 44.

As shown in FIG. 1, the lower plate portion 24 constituting the lower face of the outlet opening end portion 21 of the heater duct 2 protrudes farther forward than an upper plate portion 25 constituting an upper face of the outlet opening end portion 21. The grill fixing portions 22 are formed at left and right two positions in a width direction of the lower plate portion 24 protruding forward.

As shown in FIGS. 1 and 3, a pair of contact portions 23 for coming in contact with the floor 6 is provided at opposite ends of the lower face of the outlet opening end portion 21 of the heater duct 2. In other words, the pair of left and right contact portions 23 is formed outside the pair of left and right grill fixing portions 22.

The outlet opening end portion 21 has a fastening fixing portion that is fastened and fixed, at one point near its center in the width direction, to the floor 6. In other words, in the lower plate portion 24 of the outlet opening end portion 21 at a substantially intermediate position between the pair of left and right grill fixing portions 22, a bolt insertion hole 241 through which a bolt 52 for fixing the outlet opening end portion 21 of the heater duct 2 to the floor 6 is to be inserted is formed. The outlet opening end portion 21 of the heater duct 2 is fixed, as shown in FIG. 3, at the one point near the center in the width direction, to the floor 6 by inserting the bolt 52 through the bolt insertion hole 241 and screwing the bolt 52 into a screw grommet 62 provided to the floor 6. In this manner, the fastening fixing portion is configured.

As shown in FIG. 3, each of the grill fixing portions 22 is formed to rise higher than the lower plate portion 24 located to the left and right of the grill fixing portion 22. As shown in FIGS. 7 and 8, at each of the grill fixing portions 22, the pair of ribs 222 is formed on opposite sides of the through hole 221 along an opening direction of the outlet opening end portion 21. As shown in FIG. 8, each of the ribs 222 has a substantially semicircular shape protruding upward in section orthogonal to a longitudinal direction.

Figure 6:
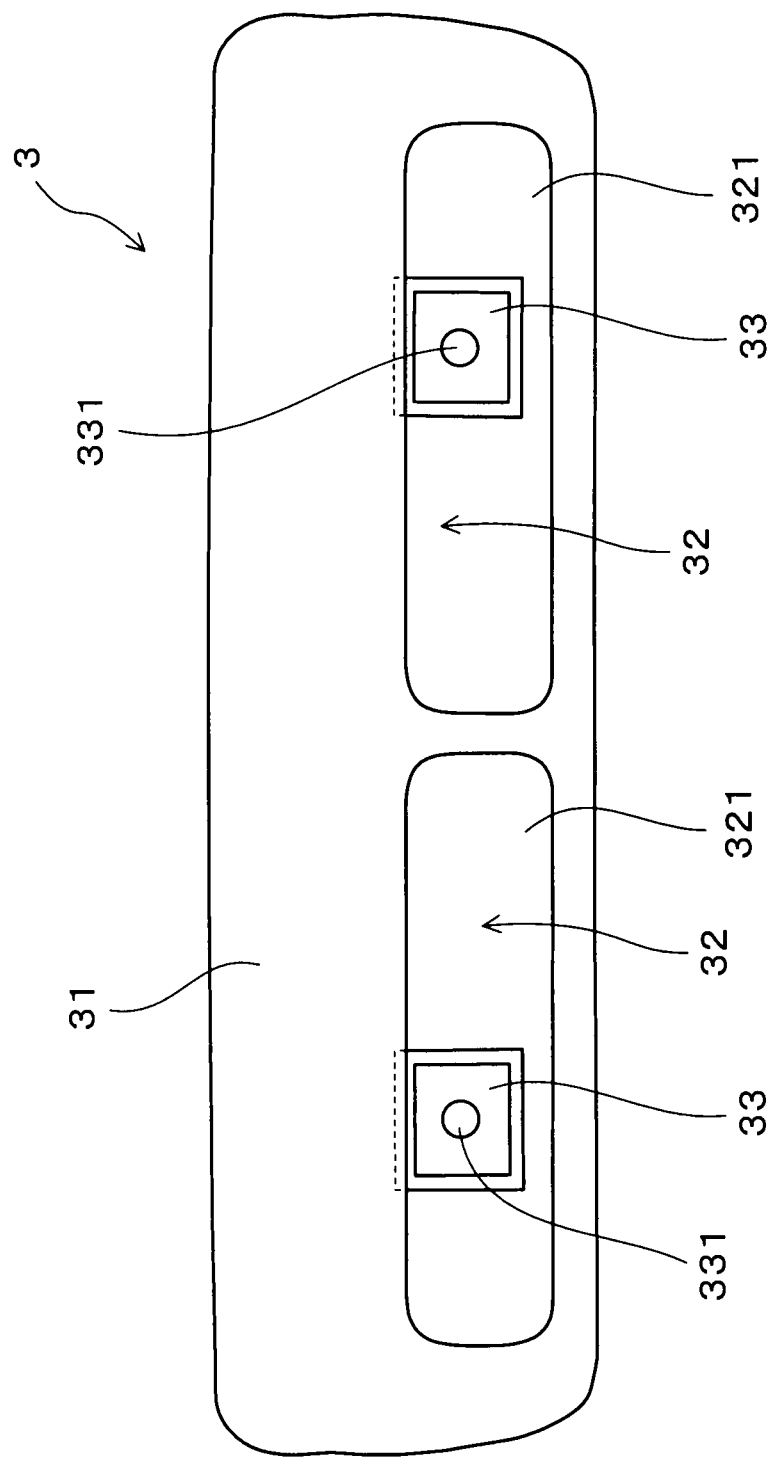
FIG. 6 is a top view of an outlet grill in the embodiment.

The outlet grill 3 is formed of a resin molded article obtained by injection molding or the like and formed by forming outlets 32 in a frame body 31 as shown in FIGS. 1 and 6. As shown in FIGS. 3, 7, and 8, at each of lower side plate portions 321 constituting lower sides of the outlets 32, a fixing seat portion 33 for coming in contact with the grill fixing portion 22 of the heater duct 2 is formed in such a manner as to sink below the lower side plate portion 321. As shown in FIGS. 6 and 8, a bolt insertion hole 331 through which the bolt 51 is to be inserted is formed in each of the fixing seat portions 33.

As shown in FIGS. 3, 7, and 8, a cap 332 for covering the fixing seat portion 33 is fitted in an upper portion of the fixing seat portion 33. An upper face of the cap 332 forms substantially the same plane as an upper face of the lower side plate portion 321 of the outlet grill 3 around the cap 332, which improves the design of the outlet grill 3.

To install the heater duct 2 and the outlet grill 3 on the floor 6 of the vehicle interior, the heater duct 2 is first fixed to the floor panel 61 constituting the floor 6 as shown in FIG. 3. A square hole is formed in the floor panel 61 and the screw grommet 62 in which the bolt 52 is to be screwed is fitted in the square hole. Then, by inserting the bolt 52 through the bolt insertion hole 241 provided in the lower plate portion 24 of the outlet opening end portion 21 of the heater duct 2 and screwing the bolt 52 into the screw grommet 62, the outlet opening end portion 21 of the heater duct 2 is fixed to the floor panel 61.

The spring nut 4 is fitted over each of the grill fixing portions 22 of the heater duct 2. The spring nut 4 may be fitted over the grill fixing portion 22 before or after fixing the heater duct 2 to the floor panel 61.

Then, the floor carpet 63 is laid over the whole floor 6 so as to cover the upper face of the heater duct 2. At this time, in order to expose the outlet opening end portion 21 of the heater duct 2 from the floor carpet 63, an opening portion is formed in advance in a predetermined position of the floor carpet 63. In this way, the heater duct 2 excluding the outlet opening end portion 21 is covered with the floor carpet 63. The outlet grill 3 is then fixed to the outlet opening end portion 21 of the heater duct 2 exposed from the floor carpet 63.

In other words, as shown in FIGS. 3, 7, and 8, the pair of fixing seat portions 33 of the outlet grill 3 is brought into contact with the spring nuts 4 disposed at the pair of grill fixing portions 22 of the heater duct 2. Then, the bolts 51 are inserted through the bolt insertion holes 331 of the respective fixing seat portions 33 and the through holes 221 of the respective grill fixing portions 22 and screwed into the spring nuts 4. In this way, as shown in FIGS. 2 and 3, the outlet grill 3 is fixed to the outlet opening end portion 21 of the heater duct 2.

At this time, as shown in FIG. 3, the frame body 31 of the outlet grill 3 retains an opening end 631 of the floor carpet 63. The caps 332 for covering the fixing seat portions 33 are fitted in the upper portions of the fixing seat portions 33 where head portions of the bolts 51 are disposed.

By this process, the duct installation structure 1 (FIG. 2) is obtained in which the heater duct 2 fixed to the floor 6 is covered with the floor carpet 63 and the outlet opening end portion 21 of the heater duct 2 is open into the vehicle interior via the outlet grill 3. It is to be noted that in FIG. 2, the floor carpet 63 is not shown.

Next, operation and effects of the present embodiment will be described.

In the duct installation structure 1, the grill fixing portions 22 are integrally molded with the duct main body portion 20. The outlet grill 3 is directly fixed to the grill fixing portions 22. In this way, it is possible to directly fix the outlet grill 3 and the duct main body portion 20 to each other without interposing a bracket therebetween. Therefore, the number of component parts of the duct installation structure 1 can be reduced.

As a result, it is possible to achieve reduction in weight and cost of the duct installation structure 1.

The pair of contact portions 23 is provided at the opposite ends of the lower face of the outlet opening end portion 21 of the heater duct 2. Therefore, it is possible to stably fix the outlet opening end portion 21 of the heater duct 2 to the floor 6 and it is also possible to secure rigidity of the outlet opening end portion 21.

The outlet grill 3 is fixed to the grill fixing portions 22 by the spring nuts 4 that are disposed and fitted to pinch the grill fixing portions 22 from the upper and lower sides and the bolts 51 screwed into the spring nuts 4. In this way, the outlet grill 3 can be easily and reliably fixed to the grill fixing portions 22. Because the ribs 222 are formed at the grill fixing portions 22 as shown in FIG. 8, the spring nuts 4 can reliably pinch the grill fixing portions 22.

Figure 9:
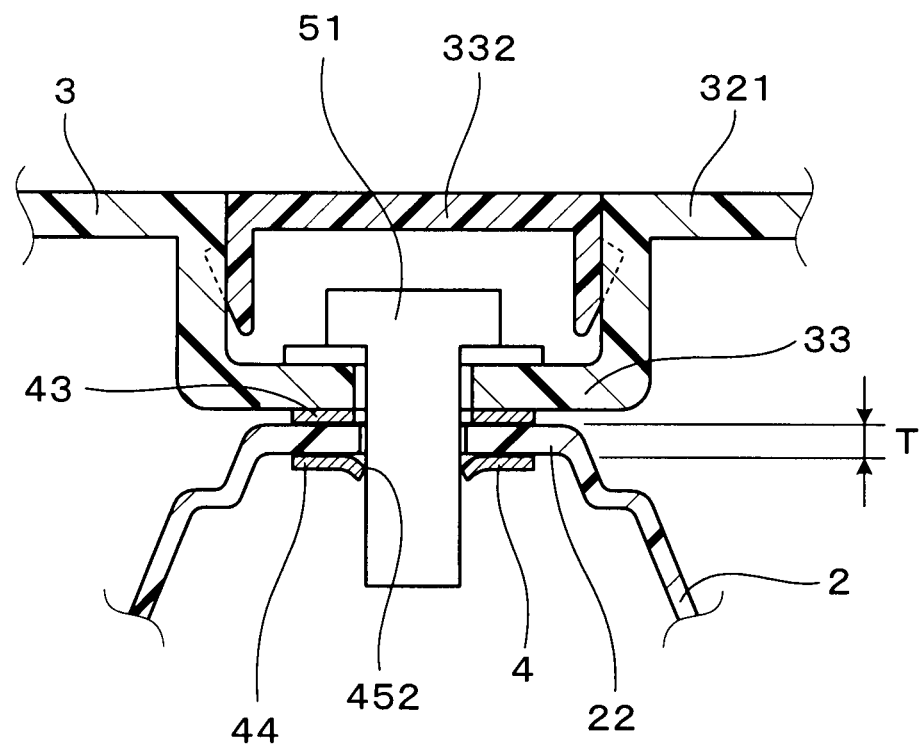
FIG. 9 is a cross-sectional view of the fastening structure of the outlet grill to the grill fixing portion along the section orthogonal to the sending direction when the grill fixing portion is not provided with ribs.
Figure 10:
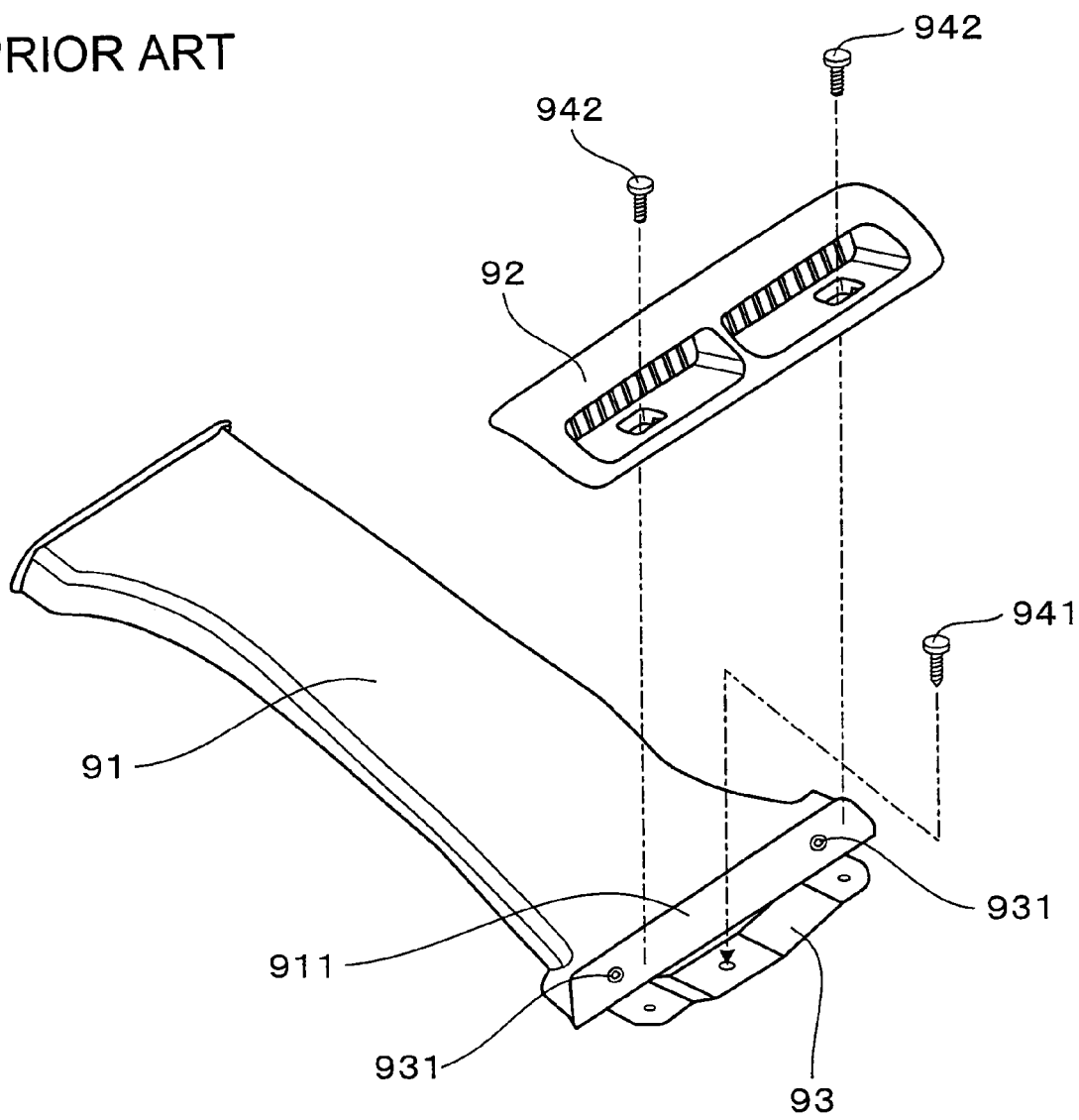
FIG. 10 is an exploded perspective explanatory view of component parts of a grill installation structure using an iron plate bracket.

If the ribs 222 (see FIG. 8) are not provided as shown in FIG. 9 and thicknesses t of the grill fixing portions 22 vary, a force of the spring nut 4 for pinching the grill fixing portion 22 may become insufficient or it may become difficult to fit the spring nut 4 over the grill fixing portion 22.

In other words, if the thickness t of the grill fixing portion 22 is excessively small, the force of the spring nut 4 for pinching the grill fixing portion 22 may become insufficient. As a result, the spring nut 4 may come off or be displaced before fixing the outlet grill 3 with the bolt 51 after disposing the spring nut 4 at the grill fixing portion 22.

If the thickness t of the grill fixing portion 22 is excessively large, on the other hand, an insertion load at the time of attaching the spring nut 4 to the grill fixing portion 22 may become so large that attachment of the spring nut 4 may become difficult.

Especially because the duct main body portion 20 is molded by blow molding, it is difficult to control the thickness t of the grill fixing portion 22 and the above problems are likely to occur.

Therefore, in the present invention, by providing the ribs 222 to each of the grill fixing portions 22, heights of the ribs 222 provide a fitting thickness T required to be fitted in the spring nut 4 irrespective of the thickness t of the grill fixing portion 22, which can suppress variations in the fitting thickness T. As a result, it is possible to prevent coming off and displacement of the spring nut 4 to thereby improve workability in attaching the spring nut 4 to the grill fixing portion 22. Moreover, providing the ribs 222 reduces a contact area between the spring nut 4 and the grill fixing portion 22 to thereby reduce the insertion load. As a result, it is possible to smoothly attach the spring nut 4 to the grill fixing portion 22.

Because the grill fixing portions 22 are formed at two positions of the outlet opening end portion 21, the outlet grill 3 can be stably fixed to the outlet opening end portion 21.

As described above, according to the embodiment, it is possible to provide a duct installation structure with fewer component parts that can achieve reduction in weight and cost.

Although the present invention is applied to the duct installation structure in which the heater duct is attached to the floor of the vehicle interior in the above embodiment, it is also possible to apply the invention to the duct installation structure in which a cooler duct is attached to a ceiling of a vehicle interior.

The invention claimed is:

1. A duct installation structure, comprising:

an air conditioning duct for sending warm air or cold air into a vehicle interior of an automobile attached to a vehicle interior structure member; and an outlet grill attached to an outlet opening end portion of the air conditioning duct, the outlet opening end portion including a lower plate portion constituting a lower face of the outlet opening end portion, and an upper plate portion constituting an upper face of the outlet opening end portion, wherein a plurality of grill fixing portions to which the outlet grill is to be fixed is integrally molded with a duct main body portion at the outlet opening end portion of the air conditioning duct, wherein the outlet grill is directly fixed to the grill fixing portions, the outlet opening end portion of the air conditioning duct including, at one point near its center in a width direction, a fastening fixing portion that is fastened and fixed to the vehicle interior structure member and including, at its opposite ends in the width direction, a pair of contact portions for coming in contact with the vehicle interior structure member, wherein the lower plate portion protrudes farther forward with respect to a direction of travel of the warm or cold air than does the upper plate portion, wherein the lower plate portion is provided with a plurality of the grill fixing portions having a spring nut attached thereto for receiving a fastener, each of the grill fixing portions is formed to rise higher than the lower plate portion, and wherein the fastening fixing portion is formed in the lower plate portion.

2. A duct installation structure according to claim 1, wherein the grill fixing portion is formed between the fastening fixing portion and the contact portion of the outlet opening end portion and includes a through hole, the outlet grill is fixed to the grill fixing portion by the spring nut that is disposed and fitted to pinch the grill fixing portion from upper and lower sides and a bolt screwed into the spring nut, the grill fixing portion includes a rib protruding in a thickness direction of the grill fixing portion, and an inner face of the spring nut is in contact with the rib.

3. A duct installation structure according to claim 1, wherein the grill fixing portion is formed at a plurality of positions in the outlet opening end portion.

4. A duct installation structure according to claim 2, wherein the grill fixing portion is formed at a plurality of positions in the outlet opening end portion.

* * * * *